United States Patent
Kado et al.

(10) Patent No.: US 11,201,550 B2
(45) Date of Patent: Dec. 14, 2021

(54) CONTROL DEVICE OF THREE-TERMINAL STATIC DC CONVERTER

(71) Applicant: IKS CO., LTD., Kyoto (JP)

(72) Inventors: Yuichi Kado, Kyoto (JP); Takashi Imai, Kyoto (JP)

(73) Assignee: IKS CO., LTD., Kyoto (JP)

( * ) Notice: Subject to any disclaimer, the term of this patent is extended or adjusted under 35 U.S.C. 154(b) by 0 days.

(21) Appl. No.: 16/641,173

(22) PCT Filed: Aug. 17, 2018

(86) PCT No.: PCT/JP2018/030561
§ 371 (c)(1),
(2) Date: Feb. 21, 2020

(87) PCT Pub. No.: WO2019/039410
PCT Pub. Date: Feb. 28, 2019

(65) Prior Publication Data
US 2020/0195156 A1 Jun. 18, 2020

(30) Foreign Application Priority Data
Aug. 22, 2017 (JP) .............................. JP2017-159304

(51) Int. Cl.
*H02M 3/335* (2006.01)
*H02M 7/5387* (2007.01)

(52) U.S. Cl.
CPC ..... *H02M 3/33576* (2013.01); *H02M 7/5387* (2013.01)

(58) Field of Classification Search
CPC .............................................. H02M 3/335–42
See application file for complete search history.

(56) References Cited

U.S. PATENT DOCUMENTS

| 4,931,918 A | * | 6/1990 | Inou | G05F 1/38 |
| | | | | 363/19 |
| 2016/0322968 A1 | | 11/2016 | Mao et al. | |

(Continued)

FOREIGN PATENT DOCUMENTS

| JP | 11-196529 A | 7/1999 |
| JP | 2008-259253 A | 10/2008 |

OTHER PUBLICATIONS

International Search Report of corresponding PCT/JP2018/030561 with English translation, and Written Opinion of corresponding PCT/JP2018/030561, dated Sep. 25, 2018, 7 pages.

(Continued)

*Primary Examiner* — Peter M Novak
(74) *Attorney, Agent, or Firm* — Lewis Roca Rothgerber Christie LLP

(57) ABSTRACT

A control device includes a detector which detects a voltage of each of the DC terminals in a state where a DC voltage is applied to one of the DC terminals and said one of the DC terminals is maintained at a fixed voltage; a minimum voltage terminal selection circuit which selects a low-voltage DC terminal with a lowest voltage among the DC terminals to which the DC voltage has not been applied, based on a detection result of the detector; and an arithmetic circuit which generates, in a connected bridge circuit to which the DC voltage has been applied, an AC voltage of a size that is equal to a difference between the voltage of said one of the DC terminals to which the DC voltage has been applied and the voltage of the low-voltage DC terminal selected by the minimum voltage terminal selection circuit.

1 Claim, 4 Drawing Sheets

(56) References Cited

U.S. PATENT DOCUMENTS

2017/0373496 A1* 12/2017 Hu .................... H02M 3/33561
2018/0301989 A1* 10/2018 Yamagami ........ H02M 3/33576
2019/0058409 A1*  2/2019 Ishibashi ................ H02J 3/386

OTHER PUBLICATIONS

Extended European Search Report dated Apr. 1, 2021 for corresponding European Application No. 18848068.5 (7 pages).
Haimin Tao et al:, "Transformer-Coupled Multiport ZVS Bidirectional DC-DC Converter With Wide Input Range", IEEE Transactions on Power Electronics, Institute of Electrical and Electronics Engineers, USA, vol. 23, No. 2, Mar. 1, 2008 (Mar. 1, 2008), pp. 771-781, XP011205448, ISSN: 0885-8993.
Zhao et al:, "Buck and Boost Start-up Operation of a Three-Port Power Supply for Hybrid Vehicle Applications," Power Electronics Specialists Conference, 2005. PESC '05. IEEE 36th, IEEE, Piscataway, NJ, USA, Jan. 1, 2005 (Jan. 1, 2005), pp. 1851-1857, XP031000397, DOI: 10.1109/PESC.2005.1581883 ISBN: 978-0-7803-9033-1.

* cited by examiner

CONTROL DEVICE OF THREE-TERMINAL STATIC DC CONVERTER

CROSS-REFERENCE TO RELATED APPLICATION(S)

This application is a U.S. National Phase Patent Application and claims priority to and the benefit of International Application Number PCT/JP2018/030561, filed on Aug. 17, 2018, which claims priority of Japanese Patent Application Number 2017-159304, filed on Aug. 22, 2017, the entire contents of all of which are incorporated herein by reference.

TECHNICAL FIELD

The present invention generally relates to a control device, and in particular can be suitably applied to a control device controlling the drive of a three-terminal static DC converter to which three DC terminals are connected via a high-frequency alternating current.

BACKGROUND ART

The use of renewable energy (e.g., solar power generation) has increased across the globe to counter global warming. Consequently, usage of secondary batteries for storing renewable energy has also increasing. Fuel cells generating electricity from natural gas ($CH_3$) has also begun to increase. Because solar power generators, secondary batteries and fuel cells generate or store power via DC, the power output converts into AC via an inverter.

Nevertheless, under circumstances where the use of renewable energy is expected to increase in the future, the introduction of DC power transmission or DC distribution, in which the power output from solar power generators and the like is used as is without being converted into AC, is expected. This is based on the background that inverters are now inexpensive and highly reliable due to the development of self-extinguishing semiconductor devices in which their ON/OFF can be arbitrarily switched based on external signals, and the research and development of DC transmission and DC distribution as the next-generation distribution system are underway.

Meanwhile, when connecting different voltages via DC, a two-terminal static converter known as a solid state transformer, which converts DC into a high-frequency AC voltage, boosts or drops the high-frequency AC voltage via an AC converter, and thereafter once again converts the AC voltage into DC, is broadly used. Nevertheless, when using a converter in a DC distribution system, the adoption of a three-terminal static converter capable of safely expanding the connection (this is hereinafter referred to as a "three-terminal static DC converter"), rather than a two-terminal static converter, is desirable.

A three-terminal static DC converter is a device that is used when performing DC distribution or the like, and comprises first to third DC terminals in which bridge circuits respectively configured from four self-extinguishing elements and DC capacitors are connected in parallel, and is a DC converter capable of mutually accommodating power among the first to third DC terminals.

With this kind of three-terminal static converter, it is necessary to charge the respective DC capacitors connected to each of the DC terminals before operation, and maintain the voltage of these DC terminals at a predetermined voltage. As a method therefor, for example, PTL 1 discloses charging the DC capacitors of the respective terminals by using a pre-charge circuit which is normally provided separately. Moreover, PTL 2 discloses a method of inserting a resistor into a main circuit which controls the drive of a three-terminal static converter, charging the DC capacitors with a current that is limited by resistance, and short circuiting the resistor after the charging is complete.

CITATION LIST

Patent Literature

[PTL 1] Japanese Unexamined Patent Application Publication No. H11-196529
[PTL 2] Japanese Unexamined Patent Application Publication No. 2008-259253

SUMMARY OF THE INVENTION

Problems to be Solved by the Invention

Meanwhile, conventionally, the charging of three DC capacitors required for activating the three-terminal static converter was performed using circuits or devices other than the main circuit described above. Nevertheless, because these circuits or devices are not used during the normal operation of a three-terminal static converter, there was a problem in that the size of the overall device comprising the three-terminal static converter, and the product cost thereof, would increase.

Moreover, when activating a three-terminal static converter, it is important that the three-terminal static converter can be activated safely without being damaged.

The present invention was devised in view of the foregoing points, and an object of this invention is to propose a control device capable of safely activating a three-terminal static DC converter while suppressing the increase in the size of the device comprising the three-terminal static DC converter as well as the increase in product cost.

Means to Solve the Problems

In order to achieve the foregoing object, the present invention provides a control device which controls a drive of a multi-terminal static DC converter configured such that three or more self-excited single phase inverters, to which DC capacitors are respectively connected in parallel on a DC side, are connected on an AC side via a high frequency transformer having winding wires in a quantity corresponding to a number of the self-excited single phase inverters, and power can be accommodated among three or more DC terminals to which the corresponding self-excited single phase inverters are respectively connected, wherein the control device comprises: a detector which detects a voltage of each of the DC terminals in a state where a DC voltage is applied to one of the DC terminals and that DC terminal is maintained at a fixed voltage; a minimum voltage terminal selection circuit which selects the DC terminal with a lowest voltage among the DC terminals to which the DC voltage has not been applied based on a detection result of the detector; and an arithmetic circuit which generates, in the self-excited single phase inverter to which the DC voltage has been applied, an AC voltage of a size that is comparable to a difference between the voltage of the DC terminal to which the DC voltage has been applied and the voltage of the DC terminal selected by the minimum voltage terminal selection circuit.

Advantageous Effects of the Invention

According to the present invention, it is possible to realize a control device capable of safely activating a three-terminal static DC converter while suppressing the increase in the size of the device comprising the three-terminal static DC converter as well as the increase in product cost.

DESCRIPTION OF EMBODIMENTS

An embodiment of the present invention is now explained in detail with reference to the appended drawings.

Figure 1:
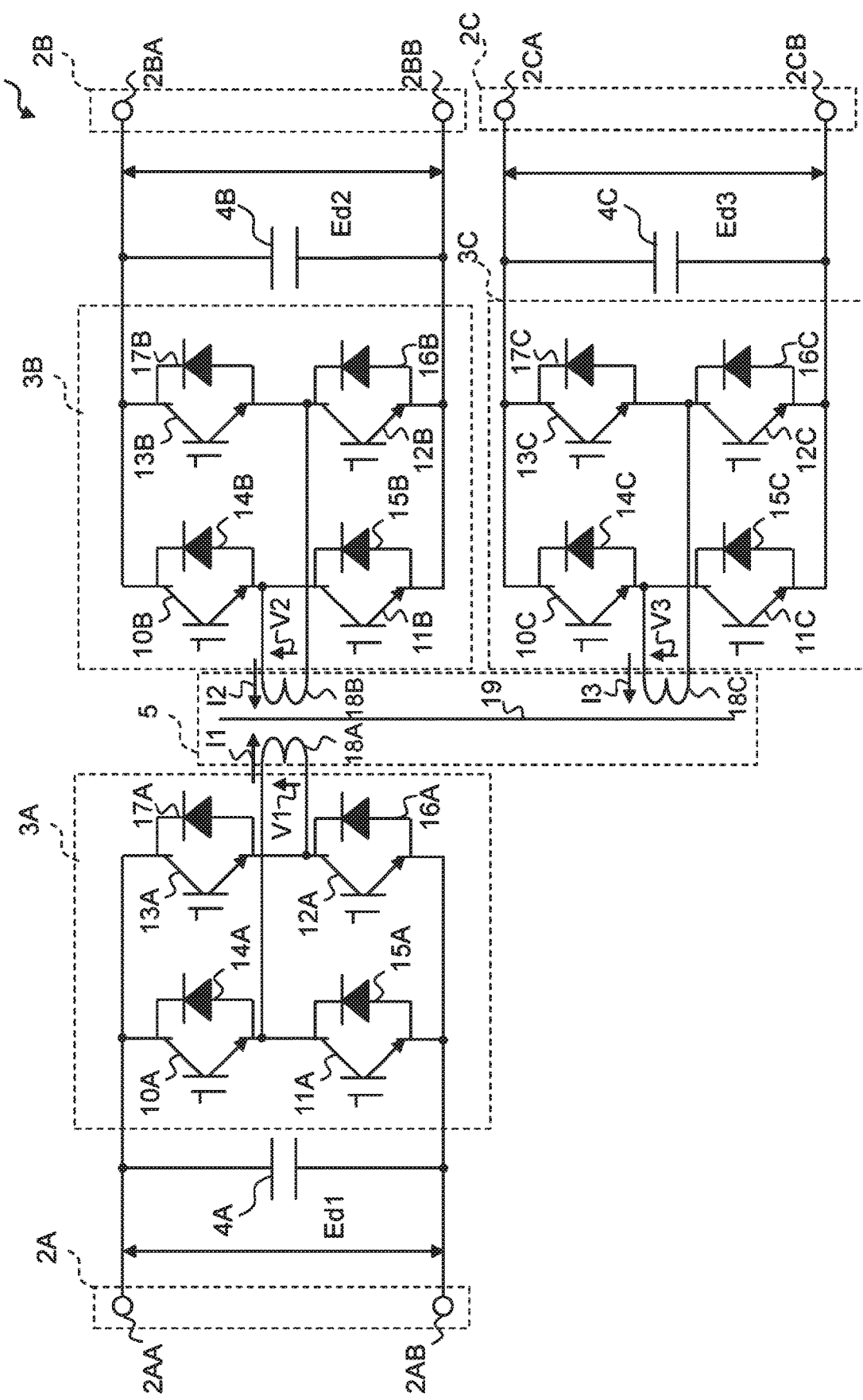
FIG. 1 is a circuit diagram showing the three-terminal static DC converter according to this embodiment.

(1) Configuration of Three-Terminal Static DC Converter According to this Embodiment In FIG. 1, reference numeral 1 shows a three-terminal static DC converter as a whole according to this embodiment. The three-terminal static DC converter 1 is configured by comprising a first bridge circuit 3A and a first DC capacitor 4A connected in parallel between first and second terminals 2AA, 2AB configuring a first DC terminal 2A, a second bridge circuit 3B and a second DC capacitor 4B connected in parallel between first and second terminals 2BA, 2BB configuring a second DC terminal 2B, a third bridge circuit 3C and a third DC capacitor 4C connected in parallel between first and second terminals 2CA, 2CB configuring a third DC terminal 2C, and a three-winding wire high frequency transformer 5 which connects the first to third bridge circuits 3A to 3C.

The first bridge circuit 3A is configured from a self-excited single phase inverter in which first to fourth self-extinguishing elements 10A to 13A as typified by IGBT (Insulated Gate Bipolar Transistors) or power MOSFET (Metal-Oxide-Semiconductor Field-Effect Transistors) are connected in a bridge shape, and first to fourth diodes 14A to 17A are respectively connected in parallel to the first to fourth self-extinguishing elements 10A to 13A.

With the first bridge circuit 3A, a connection midpoint of the first and fourth self-extinguishing elements 10A, 13A is connected to the first terminal 2AA of the first DC terminal 2A, and a connection midpoint of the second and third self-extinguishing elements 11A, 12A is connected to the second terminal 2AB of the first DC terminal 2A.

Similarly, the second bridge circuit 3B is configured from a self-excited single phase inverter in which first to fourth self-extinguishing elements 10B to 13B are connected in a bridge shape, and first to fourth diodes 14B to 17B are respectively connected in parallel to the first to fourth self-extinguishing elements 10B to 13B. Furthermore, with the second bridge circuit 3B, a connection midpoint of the first and fourth self-extinguishing elements 10B, 13B is connected to the first terminal 2BA of the second DC terminal 2B, and a connection midpoint of the second and third self-extinguishing elements 11B, 12B is connected to the second terminal 2BB of the second DC terminal 2B.

Moreover, the third bridge circuit 3C is configured from a self-excited single phase inverter in which first to fourth self-extinguishing elements 10C to 13C are connected in a bridge shape, and first to fourth diodes 14C to 17C are respectively connected in parallel to the first to fourth self-extinguishing elements 10C to 13C. Furthermore, with the third bridge circuit 3C, a connection midpoint of the first and fourth self-extinguishing elements 10C, 13C is connected to the first terminal 2CA of the third DC terminal 2C, and a connection midpoint of the second and third self-extinguishing elements 11C, 12C is connected to the second terminal 2CB of the third DC terminal 2C.

The three-winding wire high frequency transformer 5 is configured by comprising first to third winding wires 18A to 18C wound around an iron core 19. The first winding wire 18A is connected between the connection midpoint of the first and second self-extinguishing elements 10A, 11A and the connection midpoint of the third and fourth self-extinguishing elements 12A, 13A in the first bridge circuit 3A. Moreover, the second winding wire 18B is connected between the connection midpoint of the first and second self-extinguishing elements 10B, 11B and the connection midpoint of the third and fourth self-extinguishing elements 12B, 13B in the second bridge circuit 3B, and the third winding wire 18C is connected between the connection midpoint of the first and second self-extinguishing elements 10C, 11C and the connection midpoint of the third and fourth self-extinguishing elements 12C, 13C in the third bridge circuit 3C.

Figure 2:
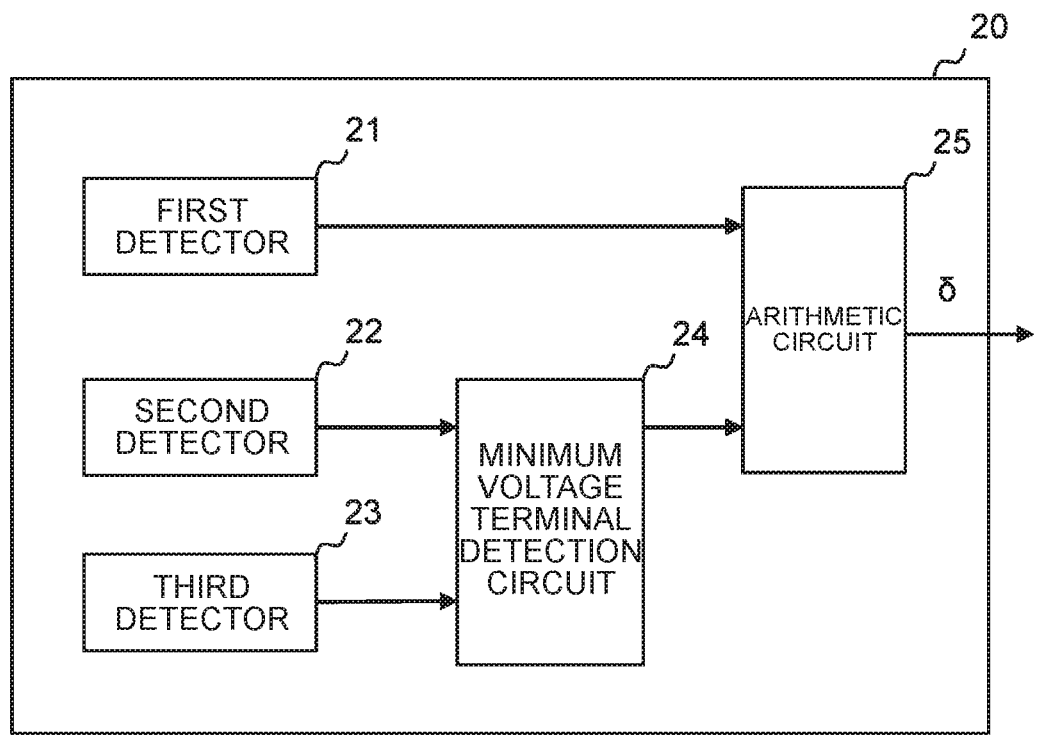
FIG. 2 is a block diagram showing a partial configuration of the control device which controls the three-terminal static DC converter of FIG. 1.
Figure 3:
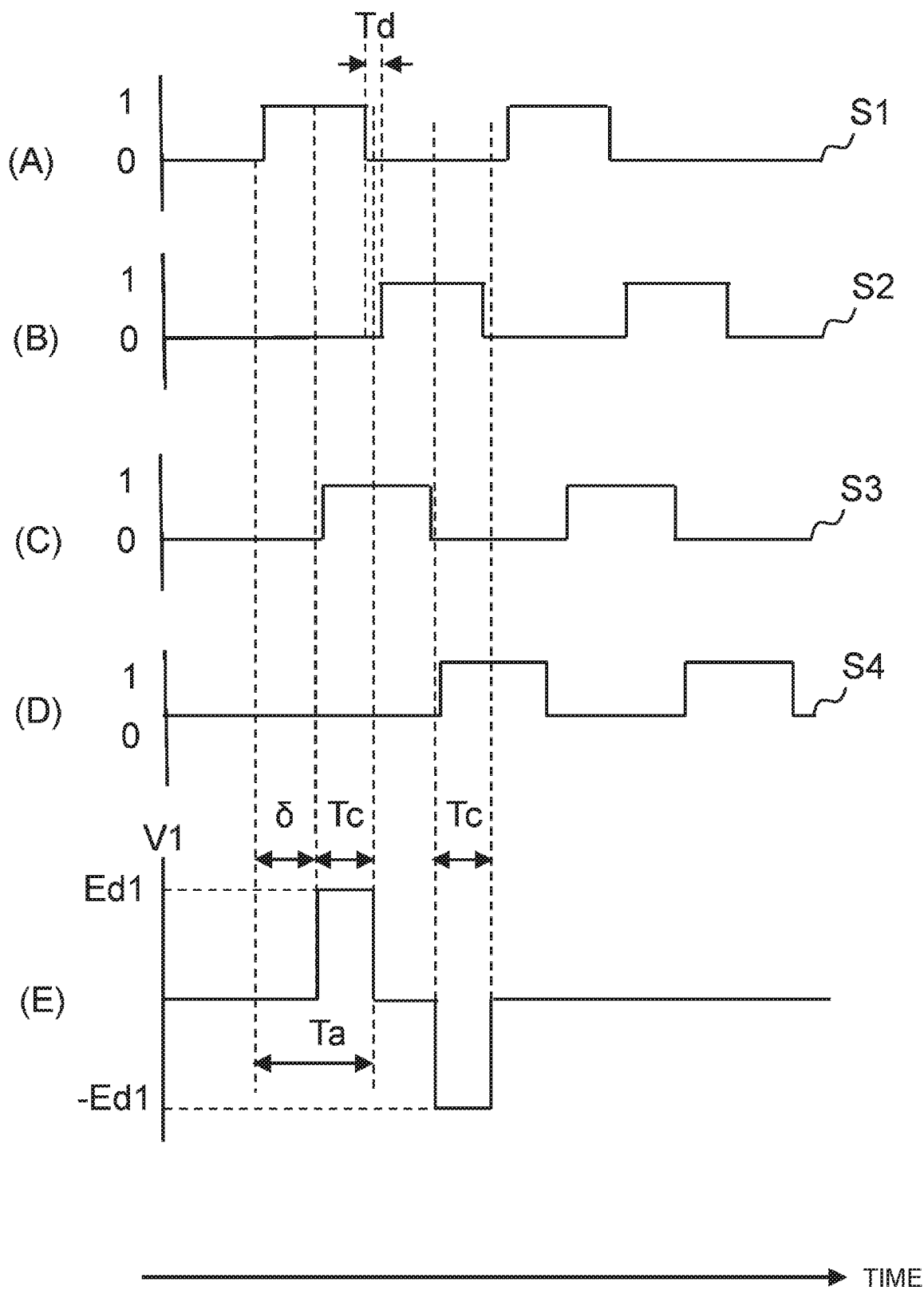
FIG. 3(A) to FIG. 3(D) are waveform diagrams showing waveform examples of the first to fourth on-pulse signals.
FIG. 3(E) is a waveform diagram showing a waveform example of the AC voltage generated in the first bridge circuit.

FIG. 2 shows the configuration of a control device 20 according to this embodiment which controls the operation of the first to third bridge circuits 3A to 3C during the normal operation of the three-terminal static DC converter 1. The control device 20 is configured by comprising first to third detectors 21 to 23, a minimum voltage terminal detection circuit 24, and an arithmetic circuit 25.

The first detector 21 is a voltage detector which detects a voltage Ed1 between the first and second terminals 2AA, 2AB of the first DC terminal 2A, and outputs the detected voltage Ed1, as first voltage information, to the arithmetic circuit 25. Moreover, the second detector 22 is a voltage detector which detects a voltage Ed2 between the first and second terminals 2BA, 2BB of the second DC terminal 2B, and outputs the detected voltage Ed2, as second voltage information, to the minimum voltage terminal detection circuit 24. Furthermore, the third detector 23 is a voltage detector which detects a voltage Ed3 between the first and second terminals 2CA, 2CB of the third DC terminal 2C, and outputs the detected voltage Ed3, as third voltage information, to the minimum voltage terminal detection circuit 24.

The minimum voltage terminal detection circuit 24 has a function of selecting the lower voltage (voltage Ed2 or voltage Ed3) of either the voltage Ed2 between the first and second terminals 2BA, 2BB of the second DC terminal 2B and the voltage Ed3 between the first and second terminals 2CA, 2CB of the third DC terminal 2C, which form an output-side terminal pair of the three-terminal static DC converter 1 of this embodiment, and notifying the selected lower voltage (voltage Ed2 or voltage Ed3) to the arithmetic circuit 25. In effect, the minimum voltage terminal detection circuit 24 selects the second or third voltage information, whichever is of a lower voltage, based on the second voltage information provided by the second detector 22 and the third voltage information provided by the third detector 23, and transfers the selected second or third voltage information to the arithmetic circuit 25.

The arithmetic circuit 25 has a function of controlling the charging of the second and third DC capacitors 4B, 4C connected respectively to the second and third bridge circuits 3B, 3C based on the first voltage information provided by the first detector 21 and the second or third voltage information provided by the minimum voltage terminal detection circuit 24.

In effect, the arithmetic circuit 25, by sending first to fourth on-pulse signals S1 to S4 respectively to the first to fourth self-extinguishing elements 10A to 13A of the first bridge circuit 3A and driving the first to fourth self-extinguishing elements 10A to 13A at the required timing, generates potential differences (voltage Ed2, Ed3) respectively between the first and second terminals 2BA, 2BB of the second DC terminal 2B and between the first and second terminals 2CA, 2CB of the third DC terminal 2C, and thereby charges the second and third DC capacitors 4B, 4C.

FIG. 3(A) to FIG. 3(D) show waveform examples of the first to fourth on-pulse signals S1 to S4 provided respectively from the arithmetic circuit 25 to the first to fourth self-extinguishing elements 10A to 13A of the first bridge circuit 3A upon activation of the three-terminal static DC converter 1.

Here, as the premise, let it be assumed that a DC voltage was applied to the first DC terminal 2A and the voltage Ed1 between the first and second terminals 2AA, 2AB of the first DC terminal 2A is being maintained at a fixed voltage. Moreover, let it be assumed that the second and third DC capacitors 4B, 4C have not been charged, and that the potential Ed2 between the first and second terminals 2BA, 2BB of the second DC terminal 2B and the voltage Ed3 between the first and second terminals 2CA, 2CB of the third DC terminal 2G are both 0V.

Note that, upon activation of the three-terminal static DC converter 1, the arithmetic circuit 25 does not provide the first to fourth on-pulse signals to the first to fourth self-extinguishing elements 10B to 13B, 10C to 13C of the second and third bridge circuits 3B, 3G to keep the first to fourth self-extinguishing elements 10B to 13B, 10C to 13C of the second and third bridge circuits 3B, 3C in an OFF state, and only the respective first to fourth diodes 14B to 17B, 14C to 17C connected in parallel to the first to fourth self-extinguishing elements 10B to 13B, 10C to 13C are operated.

As evident from FIG. 3(A) to FIG. 3(D), upon activation of the three-terminal static DC converter 1, the arithmetic circuit 25 causes the first and second self-extinguishing elements 10A, 11A of the first bridge circuit 3A to operate at 50% of the conduction duty ratio. Here, in order to avoid a DC short circuit, a dead time Td is secured between the ON period of the first self-extinguishing element 10A and the ON period of the second self-extinguishing element 11A. Note that the "ON period" of the first self-extinguishing element 10A and the second self-extinguishing element 11A is the period that the first self-extinguishing element 10A and the second self-extinguishing element 11A are turned ON and operated as a result of the first on-pulse signal S1 and the second on-pulse signal S2 rise to a logical "1" level. The same also applies to the third and fourth self-extinguishing elements 12A, 13A.

Moreover, the arithmetic circuit 25 also causes the third and fourth self-extinguishing elements 12A, 13A of the first bridge circuit 3A to operate at 50% of the conduction duty ratio. Even in the foregoing case, in order to avoid a DC short circuit, a dead time Td is secured between the ON period of the third self-extinguishing element 12A and the ON period of the fourth self-extinguishing element 13A.

Furthermore, the arithmetic circuit 25 adjusts the phases of the first to fourth on-pulse signals S1 to S4 so that the foregoing ON period of the first self-extinguishing element 10A and the ON period of the third self-extinguishing element 12A periodically overlap for only a given period of time, and so that the ON period of the second self-extinguishing element 11A and the ON period of the fourth self-extinguishing element 13A regularly overlap only for a given period of time.

Figure 4:
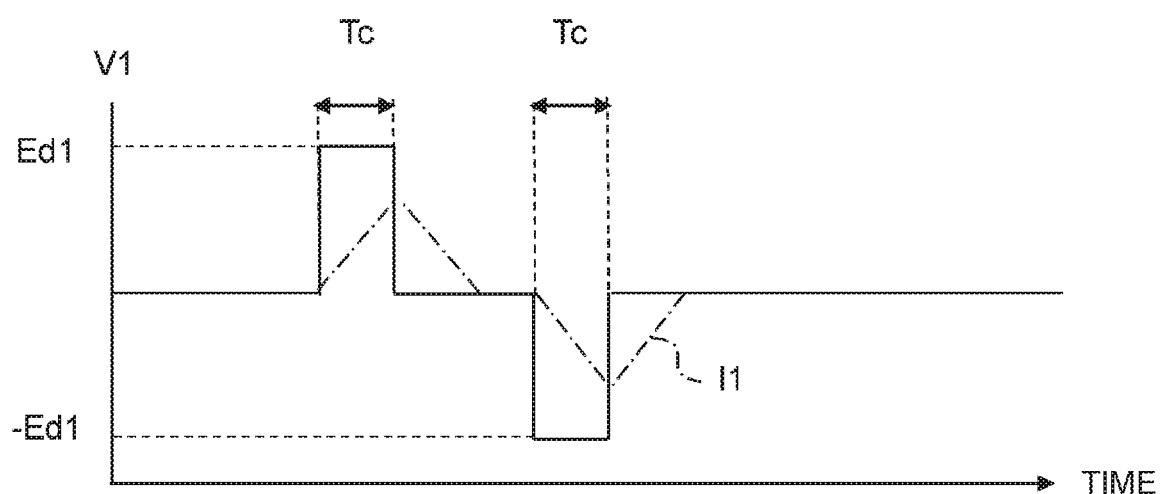
FIG. 4 is a waveform diagram showing waveform examples of the AC voltage and the AC current generated in the first bridge circuit.

When the first to fourth self-extinguishing elements 10A to 13A of the first bridge circuit 3A are operated based on the foregoing first to fourth on-pulse signals S1 to S4, as shown with the solid lines in FIG. 4, the value of the voltage V1 that is generated in the first winding wire 18A of the three-winding wire high frequency transformer 5 during a period Tc in which the ON period of the first self-extinguishing element 10A (period that the first on-pulse signal S1 rises to the logical "1" level) and the ON period of the third self-extinguishing element 12A (period that the third on-pulse signal S3 rises to the logical "1" level) overlap will be "Ed1", and the value of the voltage V1 that is generated in the foregoing first winding wire 18A during a period Tc in which the ON period of the second self-extinguishing element 11A (period that the second on-pulse signal S2 rises to the logical "1" level) and the ON period of the fourth self-extinguishing element 13A (period that the fourth on-pulse signal S4 rises to the logical "1" level) overlap will be "−Ed1". Note that, in the following explanation, this period Tc is referred to as the conduction period of the first bridge circuit 3A.

When a voltage V1 of a size of "Ed1" or "−Ed1" appears in the first winding wire 18A of the three-winding wire high frequency transformer 5, as shown with the dashed lines in FIG. 4, a current I1 will flow to the first winding wire 18A and, when the value of the voltage V1 of the first winding wire 18A becomes zero, the current I1 will stop flowing. Note that, because the three-terminal static DC converter 1 has an inductance L in the three-winding wire high frequency transformer 5 and the like, the value of the current I1 will change, as shown with the dashed lines in FIG. 4, as a primary function with the time as the variable.

Meanwhile, when a voltage V1 of a size of "Ed1" or "−Ed1" shown with the solid lines in FIG. 4 is generated in the first winding wire 18A of the three-winding wire high frequency transformer 5, on the side of the second bridge circuit 3B, a current will flow into the second DC capacitor 4B (that is, a potential difference Ed2 will be generated between the first and second terminals 2BA, 2BB of the second DC terminal 2B) via the second diode 15B, the second winding wire 18B and the fourth diode 17B, or via the third diode 16B, the second winding wire 18B and the first diode 14B, and the second DC capacitor 4B is thereby charged.

Similarly, here, on the side of the third bridge circuit 3C, a current will flow into the third DC capacitor 4C (that is, a potential difference Ed3 will be generated between the first and second terminals 2CA, 2CB of the third DC terminal 2C) via the second diode 15C, the third winding wire 18C and the fourth diode 17C, or via the third diode 16C, the third winding wire 18C and the first diode 14C, and the third DC capacitor 4C is thereby charged.

Meanwhile, with a self-excited single phase inverter that is generally configured in the same manner as the first bridge circuit 3A, the first and third self-extinguishing elements 10A, 12A are simultaneously turned ON and operated, and during other times the second and fourth self-extinguishing elements 11A, 13A are simultaneously turned ON and operated. Consequently, a voltage V1 of a size of "Ed1" or "−Ed1" will alternately appear in the first winding wire 18A of the three-winding wire high frequency transformer 5 at half the cycle that the first to fourth self-extinguishing elements 10A to 13A is turned ON/OFF.

Meanwhile, because the potential difference Ed2 between the first and second terminals 2BA, 2BB of the second DC terminal 2B and the potential difference Ed3 between the first and second terminals 2CA, 2CB of the third DC terminal 2C in the second and third bridge circuits 3B, 3C are both 0V initially, a large current I2, I3 will flow into the second and third bridge circuits 3B, 3C or the second and third DC capacitors 4B, 4C at the time that the drive of the first bridge circuit 3A is started.

When the current value of the foregoing current I2, I3 exceeds the current rating of the first to fourth self-extinguishing elements 10B to 13B, 10C to 13C configuring the second and third bridge circuits 3B, 3C, there is a possibility that the first to fourth self-extinguishing elements 10B to 13B, 10C to 13C may become damaged. Accordingly, the peak value Ip of the foregoing current I2, I3 needs to be kept within a range that will not damage the first to fourth self-extinguishing elements 10B to 13B, 10C to 13C.

As such, the method of charging the second and third DC capacitors 4B, 4C of the second and third bridge circuits 3B, 3C while keeping the current value of the current I2, I3 to be equal to or less than the current rating of the first to fourth self-extinguishing elements 10B to 13B, 10C to 13C of the second and third bridge circuits 3B, 3C is now explained.

The maximum value Ip of the foregoing current I2, I3 will be as shown in the following formula when the inductance of the circuit of the three-winding wire high frequency transformer or the like is L, and the conduction period is Tc.

[Math 1]

$$Ip = \frac{1}{L}\int_0^{Tc} Ed1\, dt \quad (1)$$

The maximum value Ip of the foregoing current I2, I3 can also be expressed with the following formula as the calculation result of Formula (1) above.

[Math 2]

$$Ip = \frac{Tc \times Ed1}{L} \quad (2)$$

Accordingly, it will suffice so as long as the maximum value Ip is equal to or less than the ampacity of the first to fourth self-extinguishing elements 10B to 13B, 10C to 13C configuring the second and third bridge circuits 3B, 3C. Thus, when the current value of the current to flow at a rated value that is equal to or less than the current rating of the first to fourth self-extinguishing elements 10B to 13B, 10C to 13C is Im, the maximum value of the conduction period Tc of the first bridge circuit 3A can be calculated based on the following formula.

[Math 3]

$$Tc = \frac{L \times Im}{Ed1} \quad (3)$$

Here, because the resistance value of the second bridge circuit 3B and the resistance value of the third bridge circuit 3C are the same, the size of the current I2, I3 that will flow to the second bridge circuit 3B and the third bridge circuit 3C will be determined based on the size of the voltage Ed2, Ed3 that appears in the second or third DC terminal 2B, 2C. Accordingly, upon determining the current value Im, the current value Im needs to be kept to a size that is equal to or less than the current rating of the first to fourth self-extinguishing elements 10B to 13B, 10C to 13C configuring the second or third bridge circuit 3B, 3C connected to the second or third DC terminal 2B, 2C in which a higher voltage will appear.

Moreover, while the foregoing explanation was provided on the assumption that the potential Ed2 between the first and second terminals 2BA, 2BB of the second DC terminal 2B and the potential Ed3 between the first and second terminals 2CA, 2CB of the third DC terminal 2C are zero, if there is a residual charge in the second DC capacitor 4B or the third DC capacitor 4C, the maximum value of the ON period T may be obtained by applying, as the denominator, (Ed1−Ed2) or (Ed1−Ed3) in substitute for "Ed1" on the right side of Formula (3). In the foregoing case, in order to suppress the current peak, the greater potential ("Ed1−Ed2" or "Ed1−Ed3") should be selected.

In light of the above, the arithmetic circuit 25 of the control device 20 according to this embodiment explained above with reference to FIG. 2 selects the smaller of either voltages Ed2, Ed3 detected respectively by the second detector 22 and the third detector 23, and computes the conduction period Tc of the first bridge circuit 3A based on the following formula.

[Math 4]

$$Tc = \frac{L \times Im}{Ed1 - \text{Min}(Ed2, Ed3)} \quad (4)$$

Moreover, the arithmetic circuit 25 calculates the delay time δ of the third on-pulse signal S3 relative to the first on-pulse signal S1 or the delay time δ of the fourth on-pulse signal S4 relative to the second on-pulse signal S2 based on the following formula

[Math 5]

$$\delta = Ta - Tc \quad (5)$$

based on the conduction period Tc and the ON period Ta in which the first to fourth on-pulse signals S1 to S4 rise to the logical "1" level, and controls the pulse generating circuit to generate the first to fourth on-pulse signals S1 to S4 based on the delay time δ.

Note that the term "delay time δ" as used herein means the delay time of the period that the third on-pulse signal S3 rises to the logical "1" level relative to the period that the first on-pulse signal S1 rises to the logical "1" level, and the delay time of the period that the fourth on-pulse signal S4 rises to the logical "1" level relative to the period that the second on-pulse signal S2 rises to the logical "1" level.

Consequently, an AC voltage and an AC current (voltage V1, current I1) of a size that is proportional to the difference between the voltage Ed1 of the first DC terminal 2A and the lower voltage (voltage Ed2 or voltage Ed1) of the second or third DC terminal 2B, 2C of either the second or third DC terminal 2B, 2C are generated in the first bridge circuit 3A, and the current I2, I3 according to the foregoing AC current will flow to the second and third bridge circuits 3B, 3C.

Accordingly, the arithmetic circuit 25 controls the size of the current I1 that flows to the first winding wire 18A of the three-winding wire high frequency transformer 5, which controls the delay time δ of the third on-pulse signal S3 relative to the first on-pulse signal S1 or the delay time δ of the fourth on-pulse signal S4 relative to the second on-pulse signal S2, and thereby controls the size of the current I2, I3 to flow to the second and third winding wires 18B, 18C of the three-winding wire high frequency transformer 5, and eventually to the second and third bridge circuits 3B, 3C.

(2) Effect of this Embodiment

As described above, in this embodiment, upon activation of the three-terminal static DC converter 1, the second DC capacitor 4B connected to the second DC terminal 2B and the third DC capacitor 4C to the third DC terminal 2C are charged based on the control of the control device 20 which controls the drive of the first to third bridge circuits 3A to 3C during the normal operation of the three-terminal static DC converter 1. Accordingly to this embodiment, there is no need to separately prepare circuits or devices for activating the three-terminal static DC converter 1, which are not used during normal operation, and the overall cost can be reduced by that much.

Moreover, here, the control device 20 controls the delay time δ of the first to fourth on-pulse signals S1 to S4 so that the size of the currents I2, I3 which respectively flow to the second and third winding wires 18B, 18C of the three-winding wire high frequency transformer 5 due to the current I1 flowing to the first winding wire 18A of the three-winding wire high frequency transformer 5 to be equal to or less than the current rating of the first to fourth self-extinguishing elements 10B to 13B, 10C to 13C configuring the second and third bridge circuits 3B, 3C. Accordingly to this embodiment, the three-winding wire high frequency transformer 5 can be safely activated without damaging the first to fourth self-extinguishing elements 10B to 13B configuring the second bridge circuit 3B and the first to fourth self-extinguishing elements 10C to 13C configuring the third bridge circuit 3C.

Accordingly to this embodiment, it is possible to realize a control device capable of safely activating a three-terminal static DC converter while suppressing the increase in the size of the device comprising the three-terminal static DC converter as well as the increase in product cost.

(3) Other Embodiments

While the foregoing embodiment explained a case of applying the present invention to the three-terminal static DC converter 1 comprising three DC terminals, the present invention is not limited thereto, and can be broadly applied to a multi-terminal static DC converter configured such that three or more self-excited single phase inverters, to which DC capacitors are respectively connected in parallel on a DC side, are connected on an AC side via a high frequency transformer having winding wires in a quantity corresponding to a number of the self-excited single phase inverters, and power can be accommodated among three or more DC terminals to which the corresponding self-excited single phase inverters are respectively connected.

REFERENCE SIGNS LIST

1 ... three-terminal static DC converter, 2A to 2C ... first to third DC terminals, 3A to 3C ... first to third bridge circuits, 4A to 4C ... first to third DC capacitors, 5 ... three-winding wire high frequency transformer, 10A to 13A, 10B to 13B, 100 to 130 ... first to fourth self-extinguishing elements, 14A to 17A, 14B to 17B, 14C to 17C ... first to third diodes, 18A to 18C ... first to third winding wires, 19 ... iron core, 20 ... control device, 21 to 23 ... first to third detectors, 24 ... minimum voltage terminal detection circuit, 25 ... arithmetic circuit.

The invention claimed is:

1. A control device for controlling a drive of a multi-terminal static DC converter configured such that three or more bridge circuits configured from respective self-excited single phase inverters, to which DC capacitors and DC terminals are respectively connected in parallel on a DC side, are connected on an AC side via a high frequency transformer having winding wires in a quantity corresponding to a plurality of bridge circuits the control device comprising:
   a detector which detects a voltage of each of the DC terminals in a state where a DC voltage is applied to one of the DC terminals and said one of the DC terminals is maintained at a fixed voltage;
   a minimum voltage terminal selection circuit which selects a low-voltage DC terminal with a lowest voltage among the DC terminals to which the DC voltage has not been applied, based on a detection result of the detector; and
   an arithmetic circuit which generates, in a connected bridge circuit to which the DC voltage has been applied, an AC voltage of a size that is equal to a difference between the DC voltage of said one of the DC terminals to which the DC voltage has been applied and the voltage of the low-voltage DC terminal selected by the minimum voltage terminal selection circuit,
   wherein each of the bridge circuits comprises:
   four self-extinguishing elements connected in a bridge shape, wherein the arithmetic circuit:
      calculates, based on the difference between the voltage of said one of the DC terminals to which the DC voltage has been applied and the voltage of the low-voltage DC terminal selected by the minimum voltage terminal selection circuit, a delay time of a period, equal to a time period that one of the self-extinguishing elements is turned ON and operated, that a second self-extinguishing element that is not adjacent to the one of the self-extinguishing element is turned ON and operated; and
      controls, based on the delay time, the bridge circuit connected to said one of the DC terminals to which the DC voltage has been applied so as to generate an AC voltage of a size that is equal to the difference between the voltage of said one of the DC terminals to which the DC voltage has been applied and the voltage of the low-voltage DC terminal selected by the minimum voltage terminal selection circuit.

* * * * *